United States Patent [19]
Nixon

[11] Patent Number: 5,585,837
[45] Date of Patent: Dec. 17, 1996

[54] DISTRIBUTION OF LOCAL VIDEO SIGNAL WITH CONSUMER CABLE TELEVISION SIGNAL

[76] Inventor: Dale B. Nixon, 3519 Brookline La., Farmers Branch, Tex. 75234

[21] Appl. No.: 405,277

[22] Filed: Mar. 15, 1995

[51] Int. Cl.$^6$ ...................................................... H04N 7/16
[52] U.S. Cl. ............................... 348/6; 348/8; 348/724
[58] Field of Search ............................ 348/6, 8, 9, 554, 348/722, 724; 388/335

[56] References Cited

U.S. PATENT DOCUMENTS

| | | | |
|---|---|---|---|
| 5,355,162 | 10/1994 | Yazolino et al. | 348/11 |
| 5,361,091 | 11/1994 | Hoarty et al. | 348/7 |
| 5,361,301 | 11/1994 | Robertson et al. | 380/7 |
| 5,361,394 | 11/1994 | Shigihara | 455/5.1 |
| 5,389,964 | 2/1995 | Oberle et al. | 348/6 |

OTHER PUBLICATIONS

Channel Plus Video Distribution Systems, 1991 Catalog, copyright 1991.
Channel Plus Innovations in Video, Getting Started, Professionally Installed Multi–Room Video Systems for the Home.
Rudolph F. Graf & Willim Sheets, "Incredible Audio & Video Projects You Can Build," 1994, Chapter 7.
"Reference Data for Engineers: Radio, Electronics, Computer, & Communications," 8th ed., 1993, Chapters 8, 9, 10 and 35.

*Primary Examiner*—Victor R. Kostak
*Assistant Examiner*—Nathan J. Flynn

[57] ABSTRACT

A video signal processing and distribution apparatus receives a cable television signal which includes a plurality of television channels. The cable television signal is transferred through one or more band block filters, each of which can block a particular channel from the cable television signal. An oscillator is provided for each local video signal that is desired to be added into the cable television signal. Each oscillator produces a carrier signal within the band of a removed television channel. The local video signal modulates the carrier signal to produce a new channel signal that is combined with the cable signal, which has had at least one selected channel removed. The resulting modified cable signal is distributed to one or more television sets wherein each set can view a plurality of new locally generated channels which have been added to the cable television signal in place of previously existing channels.

13 Claims, 5 Drawing Sheets

DISTRIBUTION OF LOCAL VIDEO SIGNAL WITH CONSUMER CABLE TELEVISION SIGNAL

TECHNICAL FIELD OF THE INVENTION

The present invention pertains in general to the distribution of cable television signals and in particular to a method and apparatus for deleting channels from and adding channels to the cable television signal.

BACKGROUND OF THE INVENTION

Video security cameras are available for use by homeowners and business people for viewing selected premises areas on a TV monitor. The most basic system of this type comprises a single video camera which has a video signal connected through a cable to a television monitor at a different location. With this combination a user can continuously monitor a particular area. For most applications, the typical system has a dedicated monitor, usually black and white, for monitoring one area by use of the video camera. A homeowner can use such a dedicated video monitor but it is often inconvenient and obtrusive to have such a monitor in the home. Some consumer television sets have a second video input for receiving baseband video signals and these sets can be used both for conventional viewing and to monitor the video signal from a security camera. However, many consumer television sets have only one input.

It is frequently desirable for persons who need video monitoring, both in homes and businesses, to have a group of such video monitors. A homeowner may want to monitor various exterior areas and interior rooms for purposes of security. Security video monitors are available which have inputs for multiple video sources. These monitors can be set to sequentially show the signals being received from each of the video cameras or to continuously monitor any one camera. While this may be acceptable to the business person who has an employee, such as a security guard, for continuously monitoring the entire business premises, a homeowner generally does not spend an extended period of time at one location monitoring a security television monitor. Further, for home use, such monitors can be obtrusive and expensive. It would be desirable for a homeowner to monitor a security camera through his usual television set, but such sets rarely have more than one extra input terminal, and many have no extra input terminal. Therefore, it is generally not possible to monitor more than one security camera through a conventional television set.

In view of these limitations, there exists a need for an electronic apparatus to enable a user, at either a home or a business, to monitor a plurality of local video cameras through a conventional television set.

SUMMARY OF THE INVENTION

A selected embodiment of the present invention comprises an electronic apparatus for receiving a cable television signal and producing a modified cable signal. The apparatus includes a first input terminal for receiving the cable television signal. A band block filter is connected to the input terminal for blocking a particular channel carried in the cable signal. The band block filter has an output terminal. A second input terminal of the electronic apparatus is connected for receiving a television video signal, such as from a video security camera. The apparatus further includes an oscillator which produces a carrier signal at an output terminal. A modulator is provided which has input terminals connected to the second input terminal for receiving the television video signal and to the oscillator output terminal for receiving the carrier signal. The modulator produces a modulated signal at an output terminal. An output terminal of the apparatus is coupled to receive the output of the band block filter as well as to receive the modulated carrier signal from the output terminal of the modulator. The modified cable signal is provided at the apparatus output terminal. The modulated signal produced by the modulator replaces the television channel in the cable signal which has been blocked by the filter.

In a further aspect of the present invention, an input switch is provided to generate a control signal that operates a variable band block filter to select a particular channel of the cable television signal to be blocked and further operates a variable frequency oscillator to produce a carrier signal having a frequency within the band of the television channel that is blocked. Thus, any desired channel can be removed from the cable television signal and replaced with a video signal from a local video source.

In a still further aspect of the present invention, a plurality of variable band block filters are provided together with a plurality of video inputs, oscillators and modulators so that a group of channels can be removed from a cable television signal and replaced with a group of local video signals.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
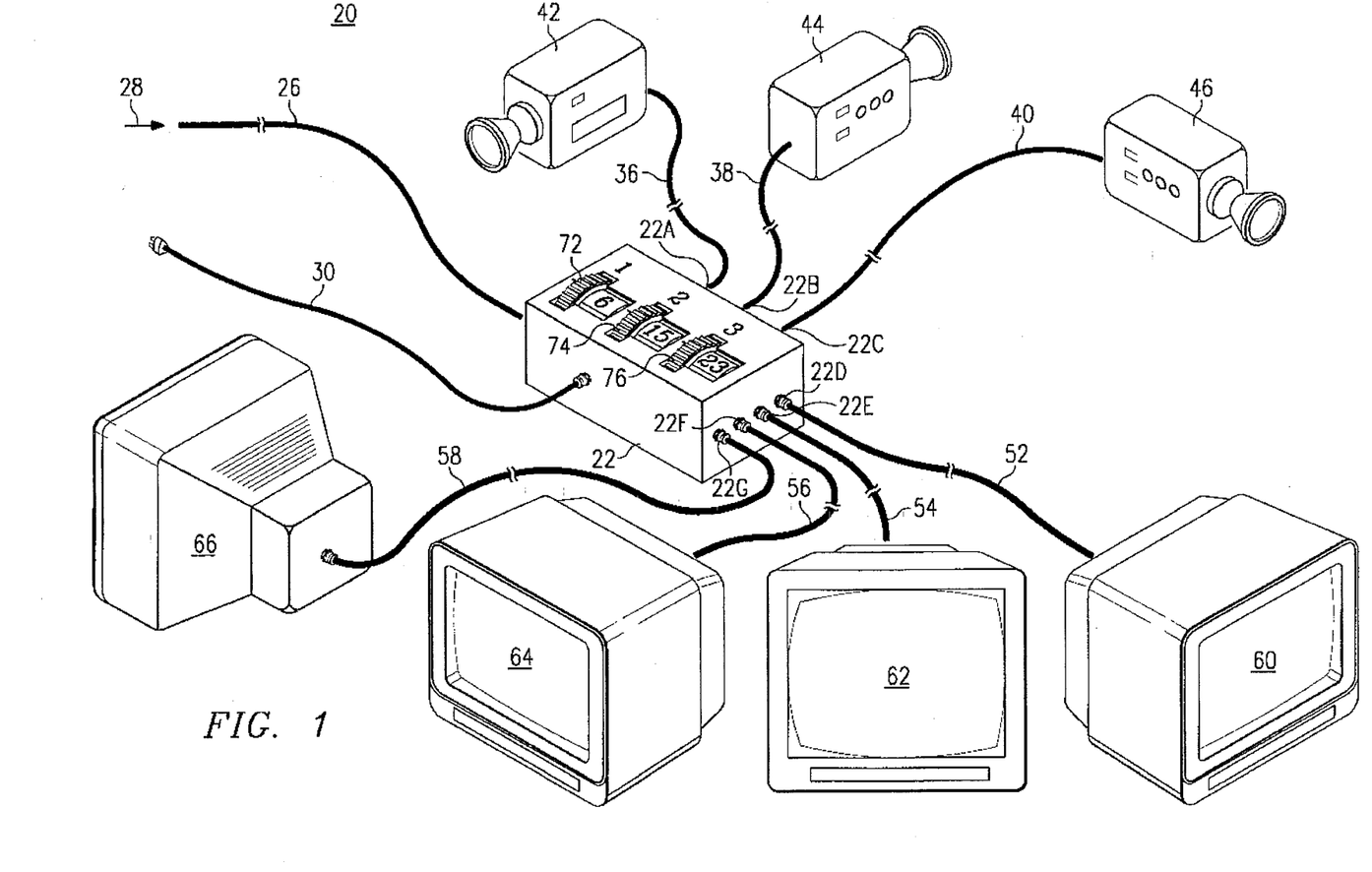
FIG. 1 is a schematic illustration of a television system which receives a cable television signal together with the plurality of local video signals for producing a modified cable signal that can be provided to a plurality of television sets.

A television video signal distribution system 20 in accordance with the present invention is illustrated in FIG. 1. A video signal selection apparatus 22, further shown in FIG. 2, has an input terminal 24 which is a connected to a coaxial cable 26 that conveys a conventional cable television signal 28. The signal 28 includes a substantial number of television channels, often more than 100, as generally provided to consumers. The apparatus 22 is provided with a standard power supply line 30.

The apparatus 22 is connected to video input lines 36, 38 and 40 which preferably are coaxial cables. The apparatus 22 is provided with corresponding coaxial connectors 22A, 22B and 22C for each video input line. A television camera 42 produces a baseband video signal which is provided through the line 36 to the apparatus 22. A video camera 44 provides a baseband video signal through line 38 to the apparatus 22 and a video camera 46 likewise provides a baseband video signal through a line 40 to the apparatus 22. The video cameras 42, 44 and 46 can be any type of video cameras, but for security use preferably are small, solid-state, CCD cameras. They may also be conventional consumer hand-held video cameras.

The apparatus 22 is connected to video output lines 52, 54, 56 and 58, each of which is preferably a coaxial cable. The apparatus 22 is provided with coaxial connectors 22D, 22E, 22F and 22G for connecting to each of these output lines.

Conventional cable reception television sets 60, 62, 64 and 66 are connected respectively to the video output lines 52, 54, 56 and 58.

The apparatus 22 is further provided with thumbwheel switches 72, 74 and 76. Each of these switches preferably has at least eleven positions with ten of these positions marked with television channel numbers. An indicator is provided on the right side of each thumbwheel to indicate the switch position that has been selected by the operator. The thumbwheel switch 72 has marked above it the numeral "1." This corresponds to the video input line 36. The thumbwheel switch 72 can be set for television channels 2–10. In operation, with thumbwheel switch 72 set to, for example, channel 6, the video baseband signal received through video input line 36 is placed on cable channel 6 in place of the channel 6 video signal present in cable signal 28.

Thumbwheel switch 74 has marked above it a numeral "2" and this is associated with the video input line 38. The positions on the thumbwheel switch 76 are marked with television channels, for example, 11–20. In a similar fashion, thumbwheel switch 76 has marked above it the reference numeral "3" and is associated with the video input line 40. Switch 76 is marked for selection of cable television channels 21–30.

For the embodiment of the present invention illustrated in FIG. 1, the thumbwheel switches of the apparatus 22 can be set to remove three selected television channels from the signal 28 and replace them with separate video signals received from the cameras 42, 44 and 46. This produces a modified cable signal which is simultaneously sent through each of the output video lines 52, 54, 56 and 58. As a result, the modified cable signal is provided simultaneously to each of the television sets 60, 62, 64 and 66.

As a further example, as shown, the video signal from camera 42 is provided on cable channel 6, the video signal from camera 44 is provided on cable channel 15 and the video signal from camera 46 is provided on cable channel 23. It is likely that a user of the apparatus 20 will have at least one channel within each group of ten channels that is of no interest and is available for use as a local video channel. Each switch 72, 74 and 76 can include any desired number of channels.

Figure 2:
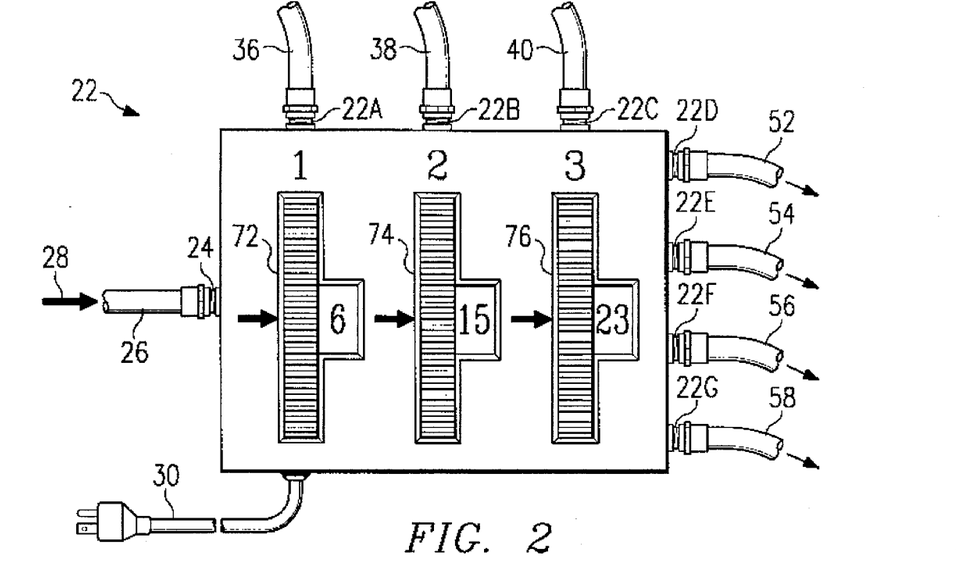
FIG. 2 is a more detailed view of the video signal selection apparatus shown in FIG. 1.

Referring now to FIG. 2, there is shown a further drawing of the apparatus 22. Each of the thumbwheel switches 72, 74 and 76 is provided with a reference number "0" position which indicates that the cable signal is passed directly through the corresponding filter without blocking any channel of the cable signal. As shown in FIGS. 1 and 2, switch 72 is set to channel 6, switch 74 is set to channel 15 and switch 76 is set to channel 23.

If all of the thumbwheel switches are set to the position indicated by reference numeral "0," the signal 28 received at the input of apparatus 22 will be provided unchanged to each of the output lines 52, 54, 56 and 58. Although four outputs are shown for the apparatus 22, any number, one or more, may be used.

Figure 3:
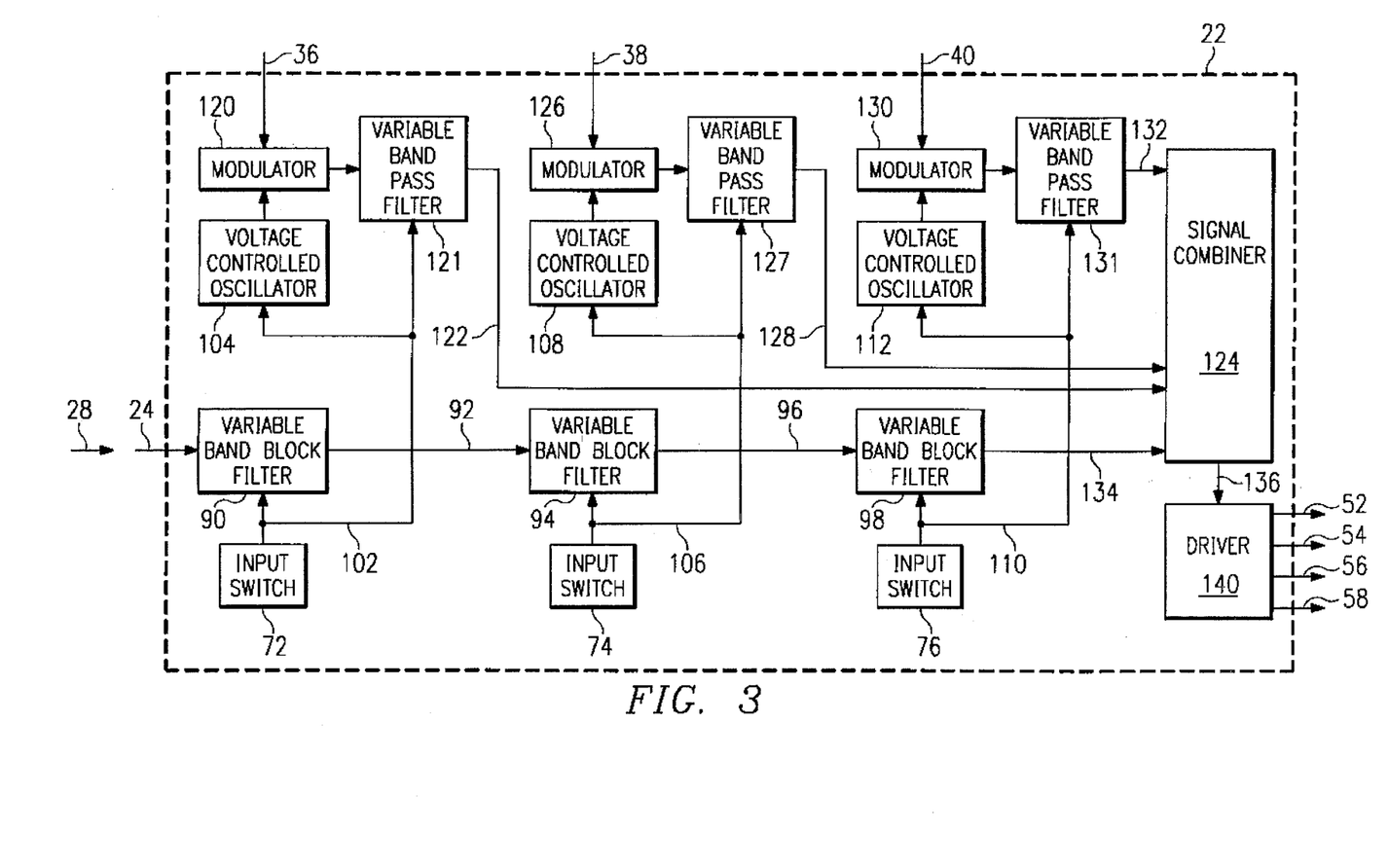
FIG. 3 is an electrical block diagram of the video signal selection apparatus shown in FIGS. 1 and 2.
Figure 6:
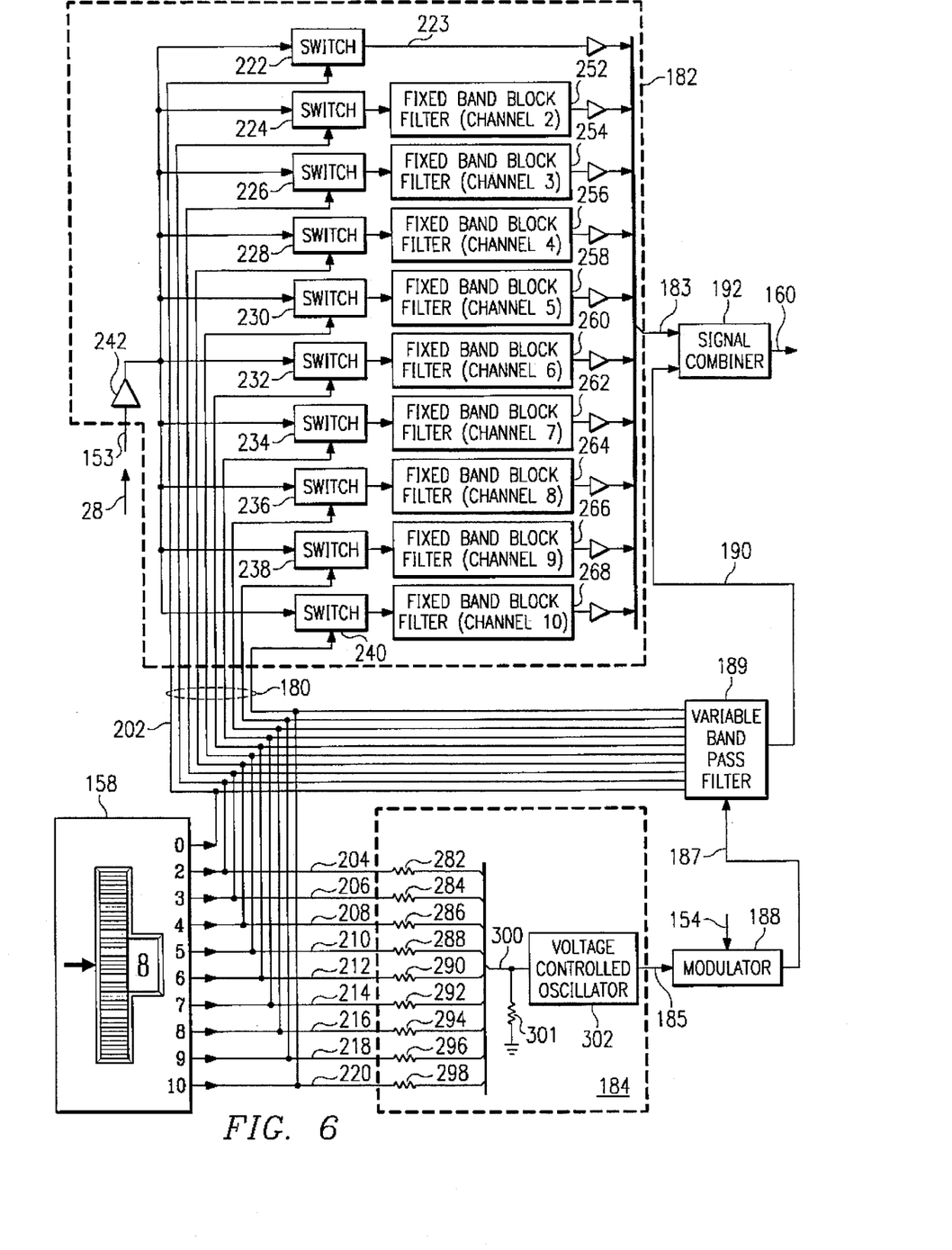
FIG. 6 is an electrical schematic and block diagram for the video signal selection apparatus shown in FIGS. 4 and 5 and is representative of circuitry shown in the block diagram of FIG. 3.

Referring now to FIG. 3, there is shown a block diagram for the video signal selection apparatus 22, as shown in FIGS. 1 and 2. The cable television signal 28 is provided through terminal 24 to a first variable band block filter 90, the output of which is connected through a line 92 to the input of a second variable band block filter 94. The output from filter 94 is connected through a line 96 to the input of a third variable band block filter 98. A particular implementation for each of these filters is shown in FIG. 6. Each of these filters, upon receipt of a control signal, selectively blocks a particular channel of the cable television signal. The remaining channels are passed without change. Thus, the series combination of filters 90, 94 and 98 can remove three selected channels from the cable television signal 28. The apparatus 22 can include any number of the band block filters.

The switch 72 produces a control signal, also referred to as a channel selection signal, which is transmitted through a line 102 to the variable band block filter 90, a voltage-controlled oscillator 104, and a variable band pass filter 121. The line 102 may actually comprise a plurality of parallel lines, as further described in FIGS. 6 and 7. The control signal produced by the switch 72, also referred to as thumbwheel switch 72, operates filter 90 to select a particular channel to be blocked, selects the frequency which is produced by the voltage-controlled oscillator 104 and selects a pass band at filter 121 for the same channel which has been blocked by the filter 90. In a preferred embodiment, the frequency of the carrier signal produced by the voltage-controlled oscillator 104 is within the band of the band block filter 90 and the band of the band pass filter 121.

Figure 7:
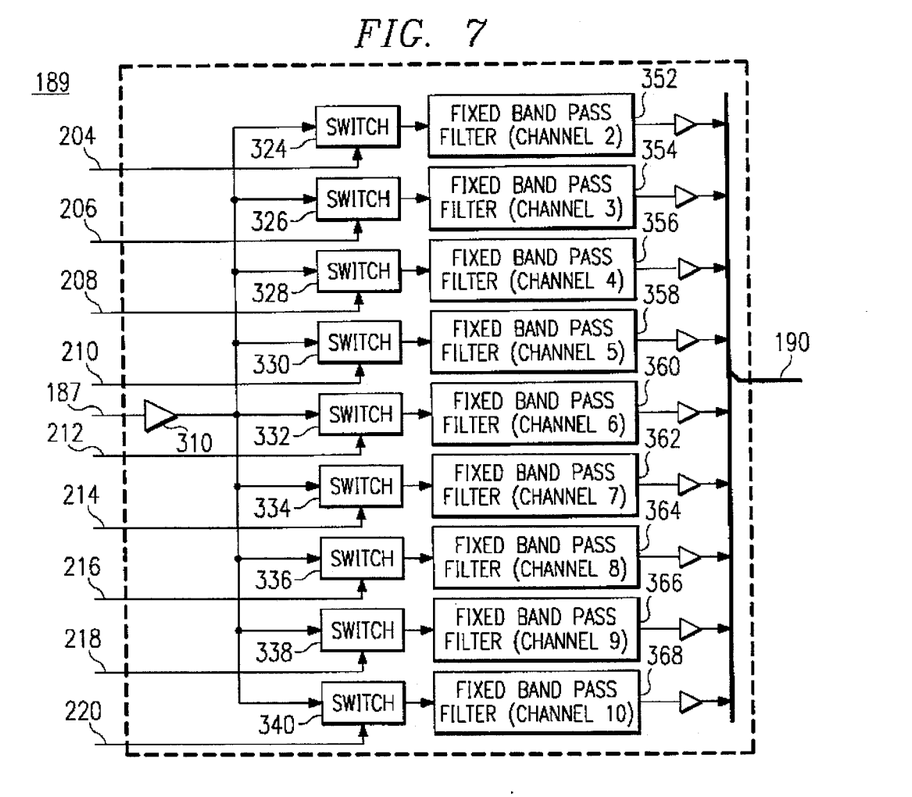
FIG. 7 is a schematic diagram for the variable band pass filter shown in FIG. 5 and FIG. 6 and is representative of the variable band pass filters shown in FIG. 3.

Switch 74 generates a control signal which is passed through a line 106 to the variable band block filter 94, a voltage-controlled oscillator 108, and a variable band pass filter 127. Likewise, the line 106 may comprise a plurality of lines, as shown in FIGS. 6 and 7. The switch 74 controls the filter 94, oscillator 108 and filter 127 in the same manner as above described for switch 72 in conjunction with filter 90, oscillator 104 and filter 121.

The switch 76 produces a control signal which is transmitted through a line, or a group of lines, 110 to the variable band block filter 98, a voltage-controlled oscillator 112, and a variable band pass filter 131. This combination of switch, filters and oscillator operates in the same manner as previously described for switch 72 and related components.

The video input line 36 provides a video signal to a modulator 120 which receives a carrier signal produced by the oscillator 104. The baseband video signal carried by line 36 modulates the carrier signal produced by oscillator 104 to produce a modulated output signal which is transmitted to the variable band pass filter 121 and then through a line 122 to one of the inputs of a signal combiner 124.

The baseband video signal carried by line 38 is provided to a modulator 126 which receives a carrier signal produced by the voltage-controlled oscillator 108 and provides a modulated carrier signal through a variable band pass filter 127 and through a line 128 to another input of the signal combiner 124.

Video input line 40 carries a video baseband signal to a modular 130 which receives a carrier signal from the oscillator 112 and provides the modulated signal through a variable band pass filter 131 and through a line 132 to a further input of the signal combiner 124.

The variable band pass filters 121, 127 and 131 eliminate any spurious signals produced by the corresponding modulators 120, 126 and 130 so that the video signals produced by the modulators, referred to as new channel signals, do not interfere with any other channels of the cable television signal.

Broadcast and cable television channels, frequencies and characteristics are defined standards which are presented in "Reference Data for Engineers: Radio, Electronics, Computer, & Communications," 8th edition, copyright 1993, chapter 35. This reference further sets forth the standardized frequency for the video, color and sound within each cable television channel. The outputs of the modulators 120, 126 and 130 are standard cable television channel signals.

The output from the filter 98 is transmitted through a line 134 as a further input to the signal combiner 124. The signal combiner 124 may comprise a resistor network for combining the multiple signals input thereto to produce a signal output on a line 136. A further possible embodiment of the signal combiner 124 is a conventional passive signal splitter in which the outputs are used as inputs and the single input becomes a signal output.

The output signal from each of the filters 90, 94 and 98 is also referred to as a blocked channel signal.

The combined output signal from the signal combiner 124, which is transmitted through line 136, is provided to the input of a driver 140 which provides the combined signal simultaneously to the group of output terminals 52, 54, 56 and 58. The electronic apparatus which provides the multiple driving function of driver 140 is well known in the art. This can comprise either a passive splitter or an active driver. The multiple outputs are desirable so that a homeowner, who has multiple television sets all connected to the cable system, can view any of the multiple local video signals produced by the security cameras at his home on any television set. It further provides all of the commercial television channels received on the cable to all of these television sets.

Referring to FIGS. 1 and 3, a homeowner, for example, may select video camera 42 to monitor the entrance to his house, camera 44 to monitor his back yard, and camera 46 to monitor a children's playroom. All three of these video signals are provided to the apparatus 22 through the respective video input lines 36, 38 and 40. The user operates the thumbwheel input switch 72 to select a cable channel for viewing the signal produced by camera 42. As noted above, this could be on channel 6. In a similar fashion, the user operates the thumbwheel input switches 74 and 76 to respectively select channels, such as 15 and 23, for viewing the images produced by the television cameras 44 and 46. When this selection process has been completed, the homeowner can then monitor the images produced by any of the television cameras 42, 44 and 46 through each of the television sets 60, 62, 64 and 66. If the homeowner normally watches television 66 for entertainment, he can periodically operate the remote control of the set to select the channels 6, 15 and 23 to monitor the areas of his home covered by television cameras 42, 44 and 46.

Some television sets now sold are provided with insert pictures, termed picture-in-picture (PIP), wherein one or more selected channels can be monitored while viewing another program. The local video signals may be viewed in these insert pictures. It is not necessary that video cameras be the only video inputs to the apparatus 22. Audio inputs can also be provided with the cameras 42, 44 and 46 for audibly monitoring the areas that are seen visually. The lines from these cameras can carry both audio and video.

Figure 4:
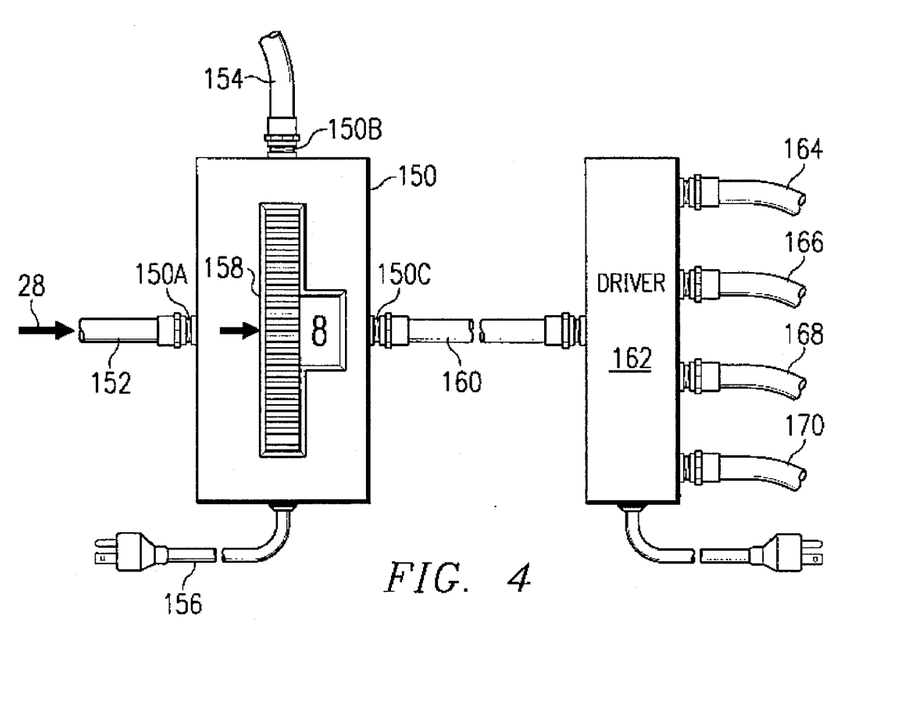
FIG. 4 is an alternate embodiment of the present invention.
Figure 5:
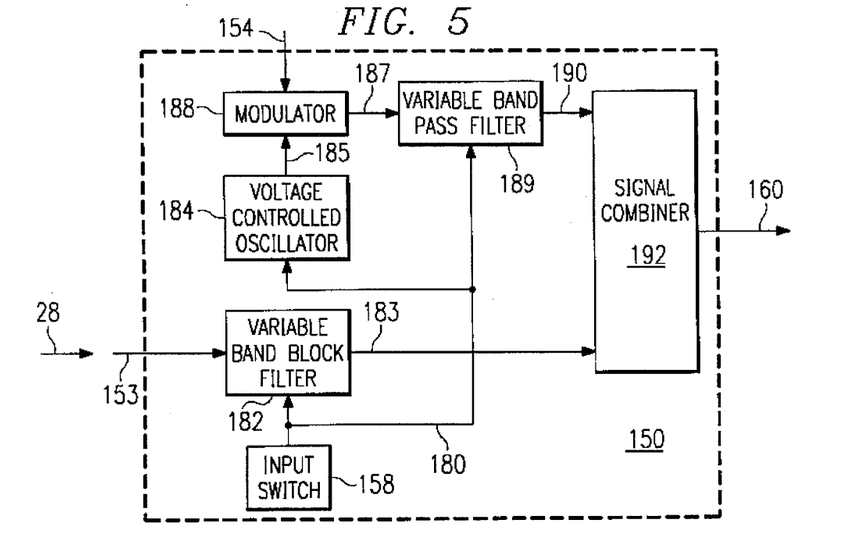
FIG. 5 is an electrical block diagram of the video signal selection apparatus shown in FIG. 4.

Referring to FIGS. 4 and 5, there is shown a further embodiment of the present invention. Although multiple input video sources and multiple output signals are shown in the embodiment illustrated in FIGS. 1–3, the present invention can likewise be implemented in an apparatus having only one local video signal and producing only one modified cable signal. A video signal selection apparatus 150 receives the cable television signal 28 through a coaxial line 152 at an input terminal 153 and receives a local video signal through a coaxial line 154, similar to that described above in reference to FIG. 1. The apparatus 150 includes a power supply line 156. Apparatus 150 further includes a thumbwheel switch 158 which is selectable for any one of a plurality of channels, including a non-selection position with a reference numeral "0." Switch 158, a control switch, is shown set to channel "8." The apparatus 150 is provided with an input coaxial connector 150A, a local video input connector 150B, and a modified cable signal output connector 150C.

The modified cable signal produced by the apparatus 150 is transmitted through an output line 160 to the input of a multiple output driver 162. The driver 162 is a commercially available product which can be purchased at consumer electronics stores. The driver 162 splits the received cable signal to provide it to output lines 164, 166, 168 and 170.

A schematic block diagram of the apparatus 150 is shown in FIG. 5. The thumbwheel input switch 158 produces a control signal which is provided through a line, or multiple lines, 180 to a variable band block filter 182, to a voltage-controlled oscillator 184, and to a variable band pass filter 189. The filter 182 and oscillator 184 are further described in reference to FIG. 6. Filter 189 is further described in FIG. 7.

The cable television signal 28 is provided through input terminal 153 to the input of the variable band block filter 182. A local video signal is provided through line 154 to a modulator 188. The video signal supplied through line 154 can be produced from a source such as one of the television cameras 42, 44 and 46 shown in FIG. 1. A further input to the modulator 188 via a line 185 is a carrier signal produced by the oscillator 184. The modulated carrier signal produced by modulator 188 is transmitted through a line 187 to a variable band pass filter 189 and from filter 189 through a line 190 to a signal combiner 192.

The output from the filter 182 is provided via a line 183 as a second input to the signal combiner 192. The signals from the modulator 188 and from the filter 182 are combined to produce the modified cable signal which is transmitted through line 160 to the driver 162 and then provided to each of the output lines 164, 166, 168 and 170.

Further referring to FIG. 5, an operator selects a setting for the thumbwheel input switch 158 to determine which channel will be blocked from the cable television signal 28. The same control signal operates the oscillator 184 to produce a carrier signal that is at the video frequency of the channel which is being blocked by the filter 182. The control signal from switch 158 is further provided to operate the variable band pass filter 189 for selecting the pass band of this filter. The pass band corresponds to the selected television channel.

The carrier signal from oscillator 184 is provided to the modulator 188 and is modulated with the video baseband input signal received through line 154. This modulated signal is provided through line 187, filter 189 and line 190 to the signal combiner 192 where it is combined with the output of filter 182 to produce the modified cable signal which is transmitted through line 160. The modulated signal produced by modulator 188 is in the frequency location of the cable channel that was deleted by the band block filter 182.

Referring now to FIG. 6, there is shown a more detailed embodiment of the apparatus 150 illustrated in FIGS. 4 and 5 and further represents the variable band block filters and voltage-controlled oscillators illustrated in FIG. 3. Switch 158 has ten output terminals numbered 0 and 2–10 and connected respectively to lines 202, 204, 206, 208, 210, 212, 214, 216, 218 and 220. The switch 158 has at least ten selectable positions and when any one position is selected, a corresponding one and only one output line has supplied thereto a fixed DC voltage. The remaining output lines are open. For example, as shown, position 8 (for channel 8) is selected on the thumbwheel switch 158 and with this setting, switch 158 provides a fixed DC voltage, such as 5 volts, to line 216.

The lines 202–220 are respectively provided to control inputs of switches 222, 224, 226, 228, 230, 232, 234, 236, 238 and 240. These switches can be either mechanical or electronic. The signal 28 is provided through terminal 153 to a buffer amplifier 242 to each of the inputs of the switches 222–240.

The output of the switches 224–240 are provided respectively to fixed band block filters 252, 254, 256, 258, 260, 262, 264, 266 and 268. These are also labeled respectively channel 2 through channel 10 which correspond to cable television channels. For this example, these filters block the corresponding cable television channels indicated for each filter. The outputs of these filters are connected through buffer amplifiers to a common line 183. Each filter blocks only one channel and passes the remaining channels.

The output of the switch 222 is connected through a buffer amplifier to the line 183. When the input switch 158 is set to the "0" position, switch 222 is selected and the cable signal 28 is passed directly through, without any blocking, to the line 183.

The outputs of the filters 252–268, and switch 222, are each passed through a corresponding buffer amplifier to common line 183 for input to the signal combiner 192.

The lines 204–220 are also connected respectively to resistors 282, 284, 286, 288, 290, 292, 294, 296 and 298. The remaining free terminal for each of these resistors is connected to a node 300 which serves as an input to a voltage-controlled oscillator 302. A resistor 301 is connected between node 300 and ground to provide a voltage division at node 300. The combination of the resistors 282–298 and oscillator 302 comprises the voltage-controlled oscillator 184 shown in FIG. 5. The output from oscillator 184 is connected through line 185 to the input of modulator 188.

Each of the resistors 282–298 has a different resistance value so that when one of the lines 202–220 is provided with the fixed DC voltage, a different, but discrete voltage is provided at node 300 to operate the oscillator 302 to produce the required frequency of carrier signal. Continuing the example, if the thumbwheel switch 158 is set to select channel "8," as shown, the voltage generated at terminal 8, line 216, is applied through resistors 294 and 301 to produce at node 300 the required input voltage to the voltage-controlled oscillator 302 to cause oscillator 302 to produce a carrier signal having an appropriate frequency for cable channel "8." The values of the remaining resistors are likewise selected to produce the appropriate voltages for the required cable channel frequencies.

The variable band block filter 182 shown in FIG. 6 can be an embodiment for the variable band block filters 90, 94 and 98 shown in FIG. 3. Likewise, the voltage-controlled oscillator 184 shown in FIG. 6 can represent an embodiment of the voltage-controlled oscillators 104, 108 and 112 shown in FIG. 3.

The fixed band block filters 252–268, shown in FIG. 6, can be implemented by use of active components or passive components, both of which approaches are well known in the art. The design of filters is described in "Reference Data for Engineers: Radio, Electronics, Computer, & Communications," 8th edition, copyright 1993, chapters 8, 9 and 10.

The variable band pass filter 184 shown in FIG. 6 is described in further detail in FIG. 7. The filter 189 comprises a plurality of fixed band pass filters which are individually selected to give the variable nature to the filter 189. The control lines 204–220 are input respectively to switches 324, 326, 328, 330, 332, 334, 336, 338 and 340. Each of these switches may be either mechanical or electronic.

The output of modulator 188 is transmitted through line 187 to a buffer amplifier 310 which provides the modulated signal to the inputs of each of the switches 324–340.

The outputs from switches 324–340 are respectively provided to corresponding fixed band pass filters 352, 354, 356, 358, 360, 362, 364, 366 and 368. The outputs from each of these filters is passed through a corresponding buffer amplifier to the common line 190. Each of the filters 352–368 is a band pass filter for the corresponding indicated cable television channel.

Referring to FIGS. 6 and 7, in the above example, channel 8 has been selected by the input switch 158. The fixed voltage produced at terminal 8 and transmitted through line 216 is also provided as a control input to switch 336. All the other switches within the filter 189 are open. The modulated signal is transmitted through line 187 and amplifier 310 through switch 336 to the fixed band pass filter 364. This filter allows only channel 8 to the pass therethrough and eliminates any other extraneous signals, such as unwanted modulation components. The resulting filtered signal is passed through a buffer amplifier to the common line 190 for input to the signal combiner 192. Thus, for each channel of the cable television signal which can be replaced, the band block filter eliminates that channel from the original cable signal 28, and a corresponding band pass filter provides a video signal at the same frequency band which has been blocked, and the two signals are joined in the single combiner 192 to produce the modified cable signal at line 160.

The switches 222–240 and 324–340 can be two position switches in which the input signal is connected to either the corresponding filter or to a terminating resistor.

Although the variable band block filters and variable band pass filters described above are embodied as a plurality of individually selectable fixed band filters, they can also be embodied as adjustable component filters as well. Further, a keypad and microprocessor system can be used in place of the thumbwheel switches, variable oscillators and selectable fixed filters described herein.

In summary, the present invention comprises a system and electronic apparatus for receiving a cable television signal, which includes a plurality of television channels, selectively blocking one or more of those channels and replacing the blocked channels with local video signals which modulate locally produced oscillator carrier signals that have frequencies corresponding to the video frequencies of the blocked channels.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What I claim is:

1. An electronic apparatus for receiving a cable television signal and producing a modified cable signal, comprising:

a first input terminal for receiving said cable television signal, a variable band block filter connected to said input terminal, said band block filter having a center frequency and an output terminal, a second input terminal for receiving a video signal, a variable frequency oscillator which produces an output signal having a frequency within the band of said band block filter, said oscillator having an output terminal, a control switch connected to said band block filter and to said oscillator, a modulator having input terminals thereof connected to said oscillator output terminal and to said second input terminal, said modulator having an output terminal, and an output terminal of said apparatus, said apparatus output terminal coupled to said band block filter output terminal and to said modulator output terminal, and wherein said modified cable signal is provided at said apparatus output terminal.

2. An electronic apparatus as recited in claim 1 including a signal combiner having input terminals thereof connected to the output terminals of said band block filter and said modulator and said combiner having an output terminal thereof connected to said apparatus output terminal.

3. An electronic apparatus as recited in claim 1 including a driver circuit connected to the output terminals of said band block filter and said modulator output terminal and having a plurality of outputs each comprising said apparatus output terminal.

4. An electronic apparatus as recited in claim 1 wherein said control switch is a rotating thumbwheel switch.

5. An electronic apparatus as recited in claim 1 wherein said variable band block filter comprises a plurality of selectable fixed band block filters.

6. An electronic apparatus for receiving a cable television signal and producing a modified cable signal, comprising:

a first input terminal for receiving said cable television signal, a plurality of variable band block filters connected in series and coupled between said first input terminal and a filter output terminal, a plurality of video signal input terminals, a plurality of variable frequency oscillators, a plurality of modulators, each said modulator connected to a respective one of said oscillators into a respective one of said video signal input terminals, and each set modulator having an output terminal, a plurality of control switches, each control switch connected to a respective one of said variable band block filters and to a respective one of said variable frequency oscillators, a signal combiner having a plurality of inputs which are respectively connected to said modulator output terminals and to said filter output terminal, said signal combiner having an output terminal, said signal combiner having an output terminal, and an output terminal for said apparatus, said signal combiner output terminal coupled to said apparatus output terminal and wherein said modified cable signal is provided at said apparatus output terminal.

7. An electronic apparatus as recited in claim 6 including a driver circuit having an input coupled to said filter output terminal and to said modulator output terminals and having a plurality of outputs each comprising said apparatus output terminal.

8. An electronic apparatus as recited in claim 6 wherein each said variable band block filter comprises a plurality of selectable fixed band block filters.

9. A television system comprising:

a video camera which produces a baseband video signal, a television set, an electronic apparatus, comprising:

a first input terminal for receiving a cable television signal which includes a plurality of television channels, a variable band block filter connected to said input terminal, said band block filter having a band width approximately equal to the bandwidth of each of said television channels and having a selectable center frequency approximately equal to the center frequency for any one of said television channels, and said band block filter having an output terminal, a second input terminal for receiving said video signal, a variable frequency oscillator having an output terminal, a modulator having input terminals thereof connected to said second input terminal and to said oscillator output terminal, said modulator having an output terminal, an output terminal offset apparatus, said apparatus output terminal coupled to said band block filter output terminal and to said modulator output terminal, an input switch connected to said variable band block filter for selecting a center frequency thereof and connected to said oscillator for selecting the frequency thereof, and said television set coupled to said output terminal of said apparatus wherein said cable television channels, except for said one television channel, and said video camera video signal can be viewed at said television set.

10. A television system as recited in claim 9 including a signal combiner having input terminals thereof connected to the output terminals of said band block filter and said modulator and having an output terminal thereof connected to said apparatus output terminal.

11. A television system as recited in claim 9 wherein said electronic apparatus has a plurality of said output terminals.

12. A method for producing a modified cable signal from a received cable television signal which includes a plurality of channels, comprising the steps of:

generating a channel selection signal, operating a variable band block filter, which is connected to receive said cable television signal, in response to said channel selection signal to have a blocked band having a center frequency and bandwidth to block a selected one of the channels of said received cable television signal to thereby produce a blocked channel signal, generating, in response to said channel selection signal, a carrier signal having a frequency which is within the band of said blocked band, modulating said carrier signal with a baseband video signal to produce a new channel signal, and combining said blocked channel signal with said new channel signal to produce said modified cable signal.

13. A method for producing a modified cable signal as recited in claim 12 wherein said step of operating a variable band block filter includes selecting one of a plurality of fixed band block filters.

* * * * *